(12) United States Patent
Chang

(10) Patent No.: US 8,246,236 B2
(45) Date of Patent: Aug. 21, 2012

(54) LIGHT GUIDE DEVICE

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 384 days.

(21) Appl. No.: 12/489,369

(22) Filed: Jun. 22, 2009

(65) Prior Publication Data

US 2010/0128496 A1 May 27, 2010

(30) Foreign Application Priority Data

Nov. 26, 2008 (CN) .......................... 2008 1 0305762

(51) Int. Cl.
*F21V 7/04* (2006.01)
(52) U.S. Cl. ........................................ 362/628; 362/615
(58) Field of Classification Search .................. 362/26, 362/27, 628, 551, 555, 559, 560, 608, 610, 362/612, 613, 511
See application file for complete search history.

(56) References Cited

U.S. PATENT DOCUMENTS

| | | | | |
|---|---|---|---|---|
| 5,984,485 A * | 11/1999 | Poli et al. | .......................... | 362/26 |
| 6,474,859 B2 * | 11/2002 | Lepley et al. | .................. | 362/551 |
| 6,874,921 B2 * | 4/2005 | Verlage et al. | ................. | 362/487 |
| 7,109,450 B2 * | 9/2006 | Kaji et al. | ...................... | 219/620 |
| 7,121,708 B2 * | 10/2006 | Tsai | ................................ | 362/605 |
| 7,127,163 B2 * | 10/2006 | Lee et al. | ...................... | 396/198 |
| 7,677,744 B2 * | 3/2010 | Birman et al. | .................. | 362/29 |
| 7,686,494 B2 * | 3/2010 | Song | ............................. | 362/612 |
| 7,726,862 B2 * | 6/2010 | Lin | ................................ | 362/555 |
| 7,845,808 B2 * | 12/2010 | Lai | .................................. | 362/27 |
| 7,878,673 B2 * | 2/2011 | Kempkey et al. | .............. | 362/101 |
| 2002/0037134 A1 * | 3/2002 | Akamatsu et al. | .............. | 385/32 |
| 2005/0073857 A1 * | 4/2005 | Kuo | .............................. | 362/560 |
| 2005/0146869 A1 * | 7/2005 | Lee | .............................. | 362/227 |
| 2006/0171137 A1 * | 8/2006 | Tamaki | ........................... | 362/26 |
| 2009/0129121 A1 * | 5/2009 | Yoneda | .......................... | 362/628 |

FOREIGN PATENT DOCUMENTS

JP 2004014122 A * 1/2004
WO WO 2007023891 A1 * 3/2007

* cited by examiner

*Primary Examiner* — David Crowe
(74) *Attorney, Agent, or Firm* — Altis Law Group, Inc.

(57) ABSTRACT

A light guide loop includes a number of optical coupling structures and a number of luminaries. Each of the optical coupling structures includes a light incident surface and a reflecting surface. The luminaries are respectively facing the light incident surfaces of the optical coupling for emitting light to the optical coupling structures.

4 Claims, 4 Drawing Sheets

LIGHT GUIDE DEVICE

BACKGROUND

1. Technical Field

The disclosure relates to light guide devices and, more particularly, to an light guide device with simplified structure and lower cost.

2. Description of the Related Art

LED (light-emitting diode) as a popular luminary is widely used in electronic devices. Generally, in order to produce a dynamic illumination performance a huge number of LEDs need to be employed to arrange in various forms and controlled by a controlling circuit. However, the huge number of LEDs are high-cost in raw material resource and energy resource and the controlling circuit is complicated and difficult to designed and manufactured.

Therefore, what is needed is to provide a light guide device, in which the above problem is eliminated or at least alleviated.

DETAILED DESCRIPTION

Figure 1:
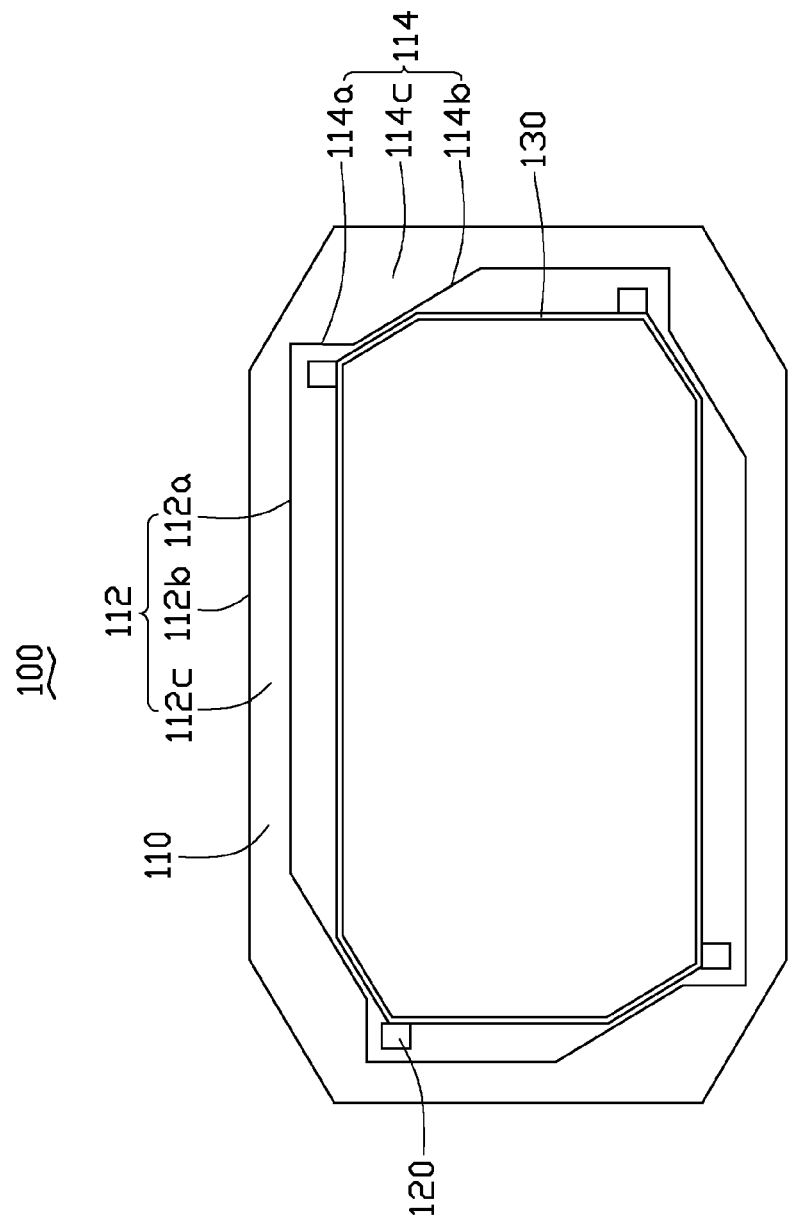
FIG. 1 is a top view of a light guide device according to a first exemplary embodiment.

Referring to FIG. 1, a light guide device 100 according to a first exemplary embodiment includes a light guide loop 110, a printed circuit board 130 and four luminaries 120 mounted on the printed circuit board 130, positioned adjacent the light guide loop 110 and spaced evenly.

The light guide loop 110 includes four light guide prisms 112 and four optical coupling structures 114. The light guide prisms are perpendicularly interconnected between adjacent optical coupling structures.

Each light guide prism 112 includes an inner surface 112a, an outer surface 112b parallel to the inner surface 112a, an upper surface 112c perpendicularly connecting the inner surface 112a and the outer surface 112b, and a lower parallel to the upper surface 112c and perpendicularly connecting the inner and outer surfaces 112a, 112b.

Each of the optical coupling structures 114 includes a light incident surface 114a perpendicularly connected to an inner surface 112a of an adjacent light guide prism 112 and parallel to the another inner surface 112a of another adjacent light guide prism 112, a reflecting surface 114b obliquely connected to the light incident surface 114a and the inner surface 112a of the light guide prism 112, and a light emitting surface 114c perpendicularly connected to the light incident surface 114a. The light emitting surface 114c is planar with the upper surface 112c of the light guide prism 112. In this embodiment, portion inner surface 112a without optical coupling structures 114, the outer surface 112b, and the bottom surface of each light guide prism 112 can be coated by a reflective layer made from the material such as aluminium, silver, mercury and so on, to serve as reflective surfaces to reflect light as similar as the reflective surface 114b of each optical coupling structure 114. Alternatively, a number of dimples, also called diffusion dots, are defined on the light guide loop at the reflecting surface 114b of the optical coupling structures 114, the portion inner surface 112a without optical coupling structures 114, the outer surface 112b, and the bottom surface of each light guide prism 112 for providing uniform light in the light guide prisms 112 and the optical coupling structures 114. The dimples or diffusion dots can be shaped as dome, taper, jagged. The dimples or diffusion dots are increasedly distributed on the light guide prism from a first end to an opposing second end of the light guide prism in distribution density to uniform the light emitted from the light guide prism.

Each luminary 120 corresponding to each light coupling structure 114 is positioned facing the light incident surface 114a of the optical coupling structure 114. The luminaries 120 are selected from the groups of LED (light-emitting diode), OLED (Organic light-emitting diode), or laser LED. The luminaries 120 are electrically connected to a controlling unit (not shown) and can be controlled to emit visible light.

In use, the luminaries 120 are triggered by the controlling unit consecutively to emit visible light which projects into the light incident surface 114a of the corresponding optical coupling structure 114. The light in the optical coupling structure 114 and the light guide prism 112 of the light guide loop 110 is reflected by the reflective surface 114b of the optical coupling structure 114, portion of the inner surface 112a, the outer surface 112b, and the bottom surface of the light guide prism 112, and than projects out from the light emitting surface 114c of the optical coupling structure 114 and the upper surface 112c of the light guide prism 112. Because the luminaries 120 are triggered consecutively, the light emitted by one luminary 120, traveling in the optical coupling structures 114 and the light guide prisms 112, is decaying gradually in brightness before next luminary 120 to be triggered, and all of those luminaries 140 are changed consecutively through which a dynamic illumination will be performed by the light guide device 100. The light guide device 100 is simple in structure and is low-cost in raw material resource and energy resource.

Obviously, the optical coupling structures 114 on the light guide prisms 112 are arranged as a ring through which the illumination performed by the luminaries 120 is consecutive and dynamic without interrupting.

Figure 2:
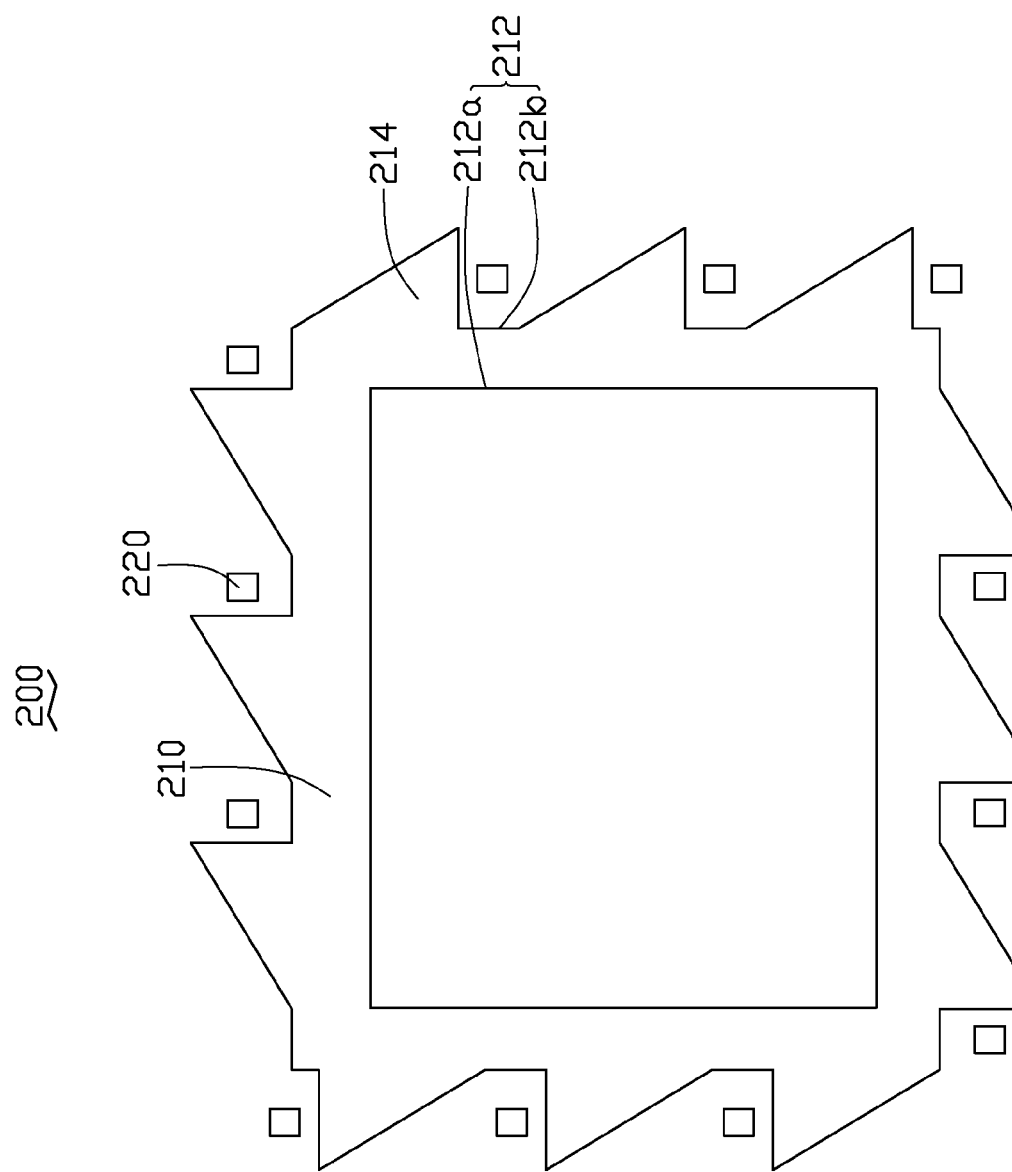
FIG. 2 is a top view of a light guide device according to a second exemplary embodiment.

Referring to FIG. 2, the second exemplary embodiment of present invention of light guide device 200 includes a light guide loop 210 and a number of luminaries 220 positioned adjacent the light guide loop 210 and spaced evenly. The light guide loop 210, similar to the first light guide loop 110, includes four light guide prisms 212, and each of the light guide prisms 212 has an inner surface 212a and an outer surface 212b opposite to the inner surface 212a. The difference between light guide devices 100 and 200 is that the light guide loop 210 includes a number of triangular optical coupling structures 214 evenly formed on the outer surface 212b and arranged as a ring. Each luminary 220 corresponding to each triangular optical coupling structure 214 is positioned adjacent to the triangular optical coupling structure 214. Alternatively, the triangular optical coupling structures 214 can also be formed on the inner surface 212a of the light guide prisms 212.

Figure 3:
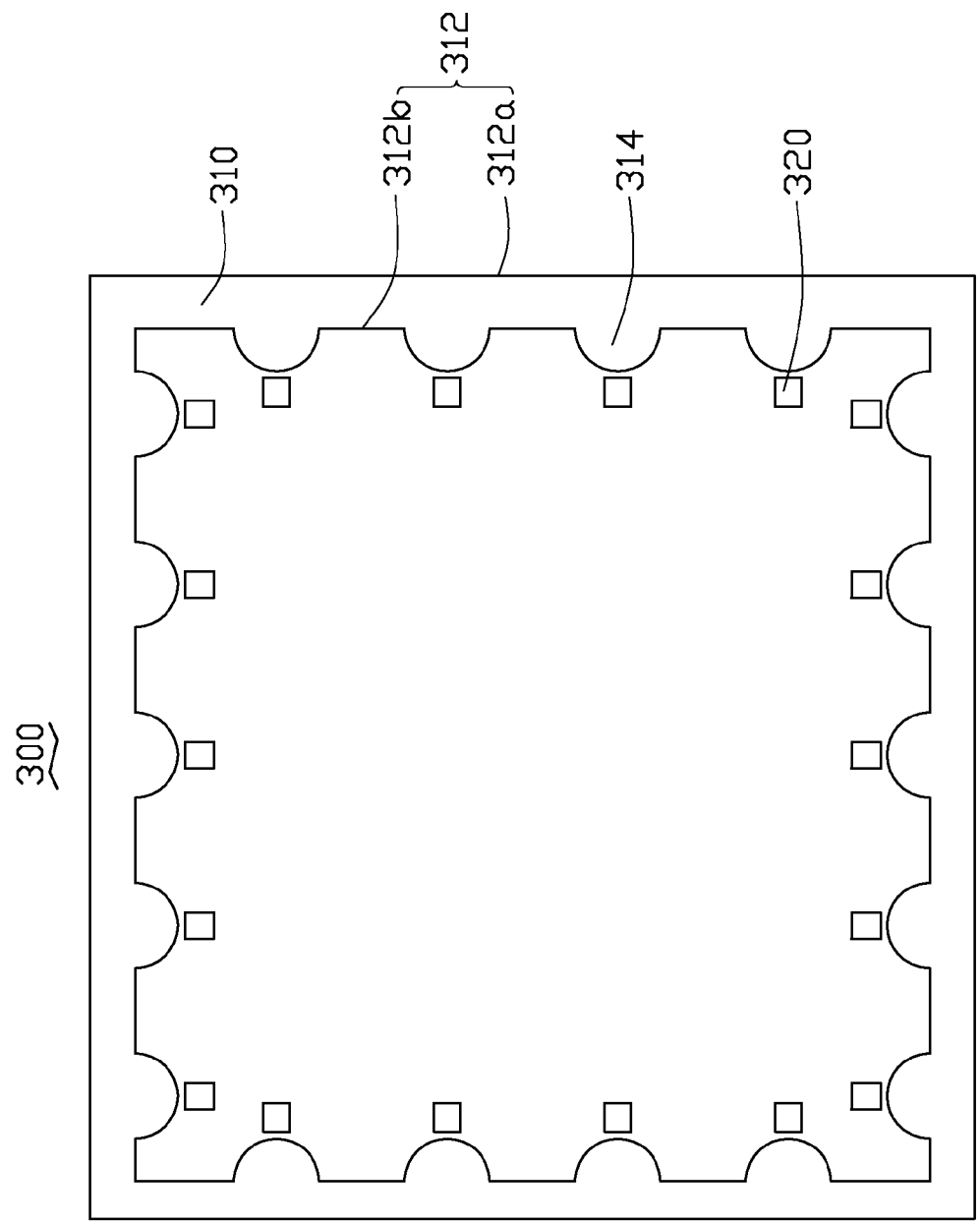
FIG. 3 is a top view of a light guide device according to a third exemplary embodiment.

Referring to FIG. 3, the third exemplary embodiment of present invention of light guide device 300 includes a light guide loop 320 and a number of luminaries 320. The light guide loop 310, similar to the second light guide loop 210, includes four light guide prisms 312. Each of the light guide prism 312 has an inner surface 312a and an outer surface 312b opposite to the inner surface 312a. The difference between light guide devices 300 and 200 is that the light guide loop 310 includes a number of semicircular optical coupling structures 314 evenly formed on the inner surface 312a and arranged as a ring. Each luminary 320 corresponding to each semicircular optical coupling structure 314 is positioned adjacent to the semicircular optical coupling structure 314. Alternatively, the semicircular optical coupling structures 314 can also be formed on the outer surface 312a of the light guide prisms 312.

Figure 4:
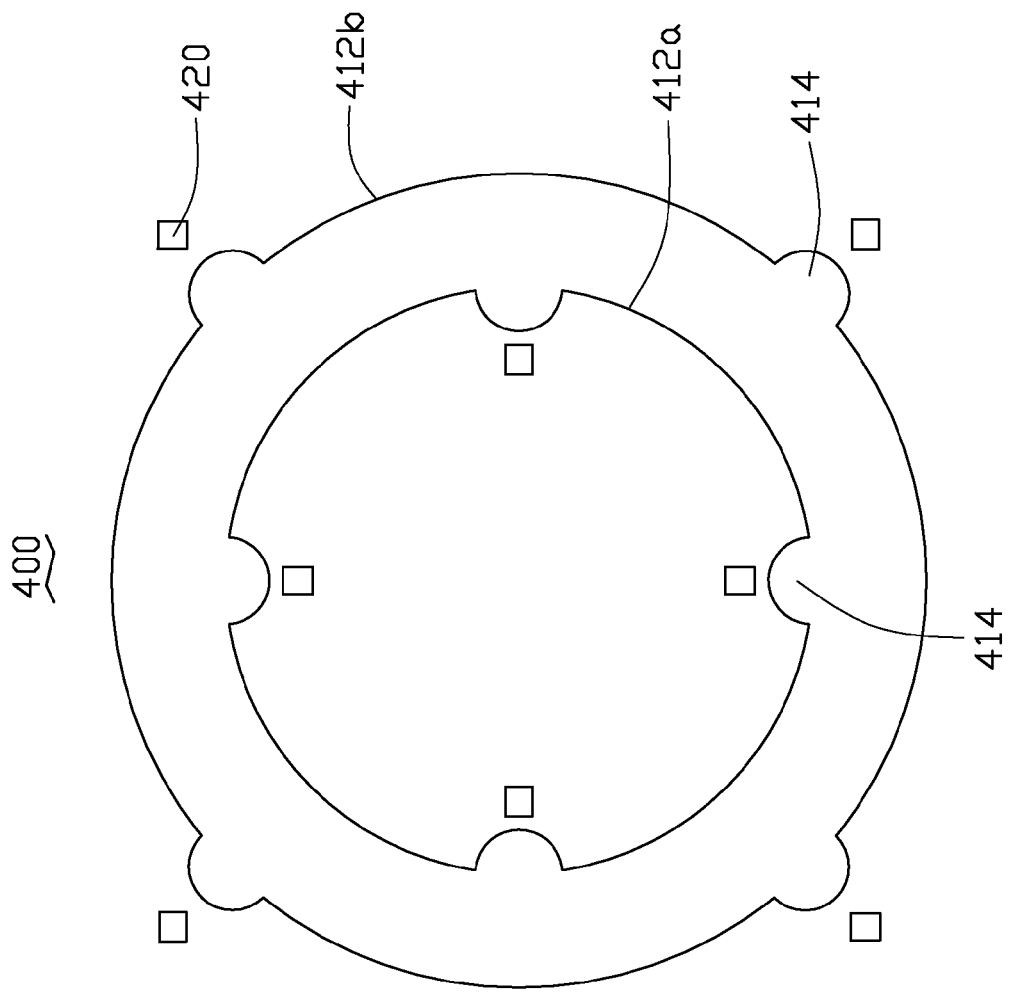
FIG. 4 is a top view of a light guide device according to a fourth exemplary embodiment.

Referring to FIG. 4, the fourth exemplary embodiment of present invention of light guide device 400 includes a light guide loop 410 and a number of luminaries 420. The light guide loop 410 is a circular ring which has an inner circumference surface 412a and an outer circumference surface 412b opposite to the inner circumference surface 412a. The light guide loop 410 includes a number of semicircular optical coupling structures 414 alternatively formed on the inner circumference surface 412a and outer circumference surface 412b evenly and arranged as a ring. Each luminary 420 corresponding to each semicircular semicircular optical coupling structure 414 is positioned adjacent the semicircular optical coupling structure 414. Understandably, the semicircular optical coupling structures 414 also may be triangular or tapered shaped.

In addition, the light guide devices 100 to 400 also includes a print circuit board (not labeled). The luminaries 120 to 420 are electrically mounted on the printed circuit board. The printed circuit board includes a control circuit (not labeled) configured for controlling the luminaries to operate in a consecutive flash manner. Alternatively, the printed circuit board may be a flexible printed circuit board that can attached on the inner side surfaces of the light guide loops 110 to 410.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A light guide device comprising:
    a polygonal light guide loop comprising
        a plurality of optical coupling structures formed at insides of corners of the polygonal light guide loop, respectively, each optical coupling structure comprising a light incident surface, a reflecting surface, and a light emitting surface perpendicular to the incident surfaces and the reflecting surfaces, the reflecting surface of each optical coupling structure being obliquely connected to the light incident surface of each optical coupling structure at an obtuse angle;
        a plurality of light guide prisms interconnected between adjacent optical coupling structures, each of the light guide prisms comprising an inner surface, an outer surface parallel to the inner surface, an upper surface perpendicularly connected between the inner surface and the outer surface, and a lower surface parallel to the upper surface, the incident surface of each optical coupling structure being perpendicularly connected to the inner surface of an adjacent light guide prism; and
    a plurality of luminaries respectively facing the light incident surfaces of the optical coupling structures for emitting light to the optical coupling structures.

2. The light guide device as claimed in claim 1, wherein a reflective layer is formed on the light guide loop.

3. The light guide device as claimed in claim 2, wherein the reflective layer is made of a material selected from the groups of aluminium, silver, mercury.

4. The light guide device as claimed in claim 1, wherein the optical coupling structures are irregular polygonal.

* * * * *